Figure 1:
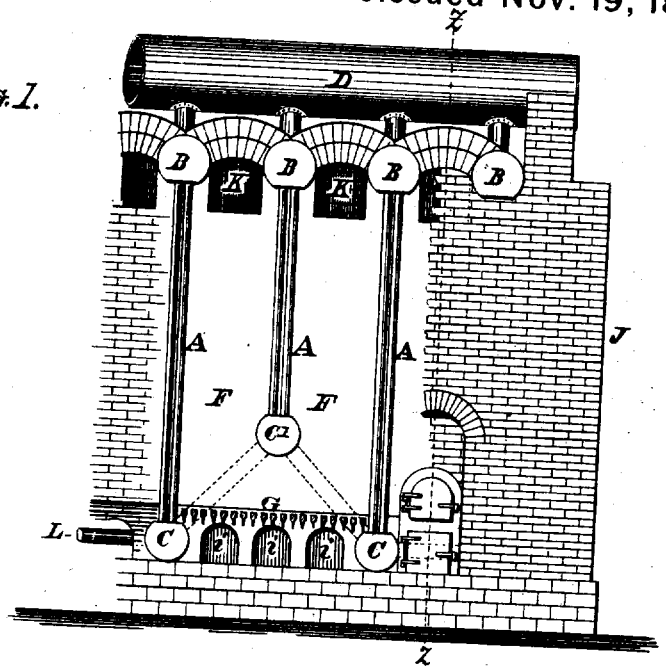

3 Sheets—Sheet 1.

J. FIRMENICH & F. P. STIKER.

Assignors to J. & G. & F. FIRMENICH.

Steam-Boiler.

No. 8,494. Reissued Nov. 19, 1878.

Witnesses:

Frank Kirsch

A. P. Ripley Jr.

Inventors:

Joseph Firmenich,
Flavius P. Stiker by Michael J. Stark
their Attorney.

THE NORRIS PETERS CO., WASHINGTON, D. C.

3 Sheets—Sheet 2.

J. FIRMENICH & F. P. STIKER.

Assignors to J. & G. & F. FIRMENICH.

Steam-Boiler.

No. 8,494. Reissued Nov. 19, 1878.

Witnesses:

Frank Kirsch

A. P. Ripley Jr.

Inventors:

Joseph Firmenich,

Flavius P. Stiker by Michael J. Stark Attorney.

THE NORRIS PETERS CO., WASHINGTON, D. C.

J. FIRMENICH & F. P. STIKER. 3 Sheets—Sheet 3.

Assignors to J. & G. & F. FIRMENICH.

Steam-Boiler.

No. 8,494. Reissued Nov. 19, 1878.

Witnesses:

Frank Hirsch

A. P. Ripley Jr.

Inventors:

Joseph Firmenich,
Flavius P. Stiker by Michael J. Stark
Attorney.

THE NORRIS PETERS CO., WASHINGTON, D. C.

UNITED STATES PATENT OFFICE

JOSEPH FIRMENICH AND FLAVIUS P. STIKER, OF BUFFALO, NEW YORK, ASSIGNORS TO JOSEPH FIRMENICH, GEORGE FIRMENICH, AND FRANK FIRMENICH, OF SAME PLACE.

IMPROVEMENT IN STEAM-BOILERS.

Specification forming part of Letters Patent No. 169,977, dated November 16, 1875; Reissue No. 8,494, dated November 19, 1878; application filed August 13, 1877.

*To all whom it may concern:*

Be it known that we, JOSEPH FIRMENICH and FLAVIUS P. STIKER, both of Buffalo, in the county of Erie and State of New York, have invented a Steam-Generator; and we do hereby declare that the following description of our said invention, taken in connection with the annexed sheets of drawings, forms a full, clear, and exact specification, which will enable others skilled in the art to which it appertain to make and use the same.

Our invention refers, in general, to steam-generators; and it consists in the construction and arrangement, as shown, with horizontal mud-drums and steam and water drums, of a double series of inclined heating-tubes, connecting said mud-drums with the steam and water drum or drums, said mud-drums being placed a sufficient distance apart to admit the grate between them to form an upper contracting combustion-chamber, and the whole inclosed within a suitable setting of proper material, as hereinafter more fully set forth and described, and subsequently pointed out in the claims.

Our invention further consists in the combination, with a steam-generator, constructed in the main as above set forth, of circulating-tubes connecting the mud-drums with the steam and water drum or drums within the combustion-chamber.

Our invention lastly consists in the peculiar arrangement of parts and details of construction, as hereinafter first fully described, and then pointed out in the claims.

In the present practice of constructing steam-generators with the heating-surface in close proximity to the fuel, the gases issuing therefrom are chilled by coming in contact with the boiler-plate, tubes, flues, or surface, which is preserved at a low temperature by the water on the opposite side, and, being a good conductor of heat, the refrigerating action is at once rapid and powerful; consequently the temperature is reduced below the point of inflammation, so that an incomplete combustion takes place, and the gases pass off partly unburned, thereby causing a proportionate loss of fuel.

A further objection to this class of steam-generators is the insufficient space within the boiler-furnace, which does not afford the necessary room for the proper intermingling and detention of the gases, which likewise results in imperfect combustion and a consequent loss of fuel.

Our improvements are made with a view of overcoming these objections, of increasing the production of steam with a given amount of fuel, of effecting a rapid circulation, and the deposition of sediment at points below the grates.

Figure 2:
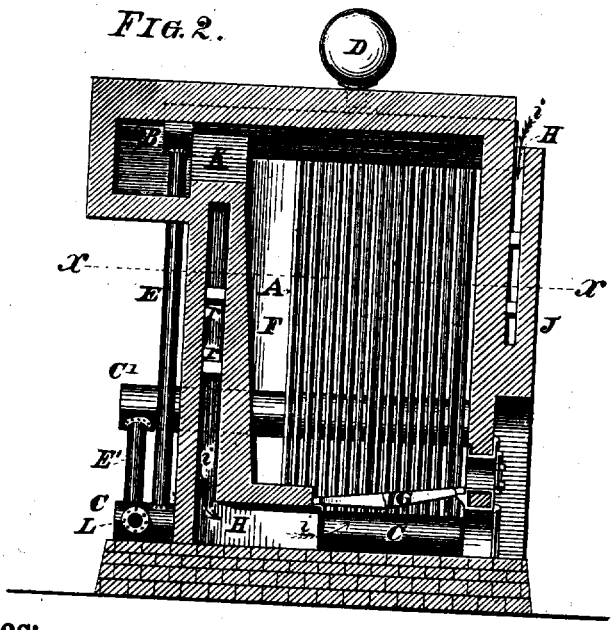
Figure 3:
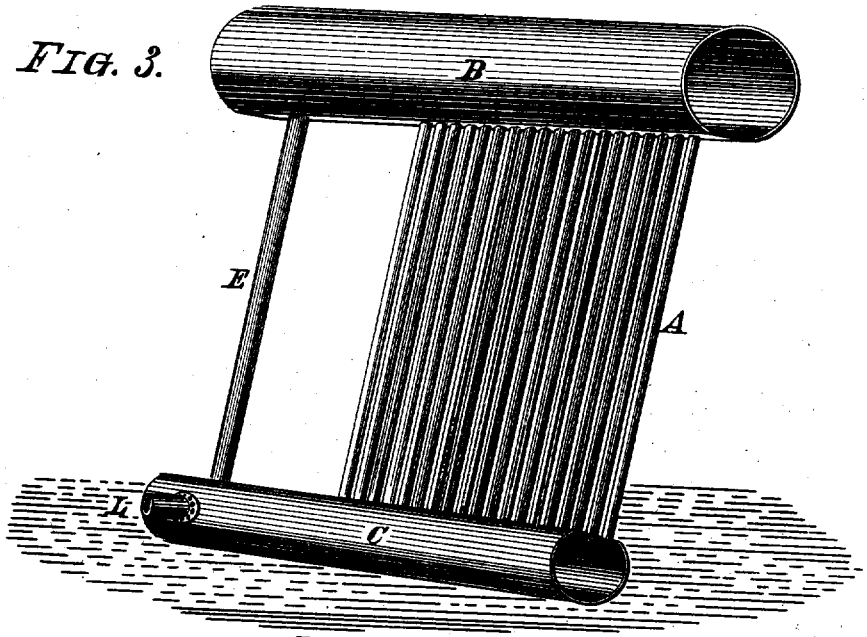
Figure 4:
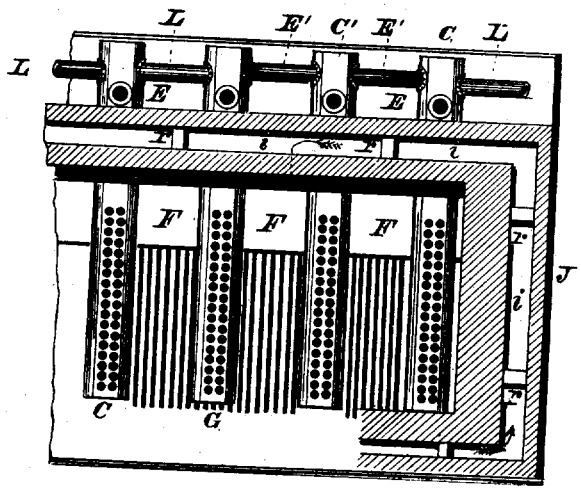
Figure 5:
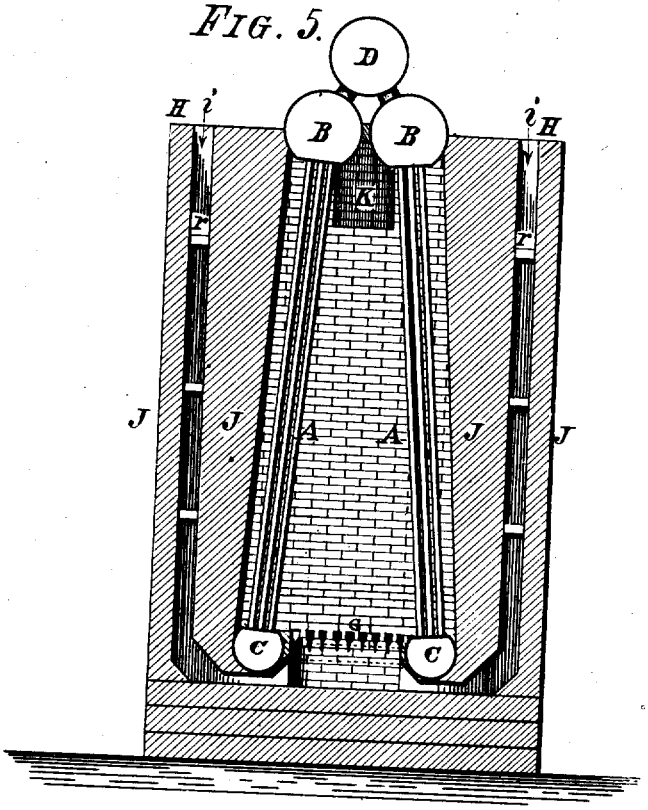
Figure 6:
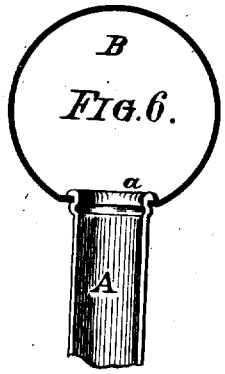

In the drawings heretofore mentioned, Figure 1 is a front elevation, parts of the wall being removed to expose the interior of a battery of steam-generators constructed in accordance with our improvements. Fig. 2 is a side elevation, in section, through line *z z* in Fig. 1. Fig. 3 is a perspective view of one of a series of sections composing a battery of boilers. Fig. 4 is a horizontal section through line *x x*, Fig. 2. Fig. 5 is a vertical transverse section of a boiler composed of two sections. Fig. 6 represents an enlarged section through a steam and water or mud drum, showing the flattened side and the method of expanding the tubes therein.

Like letters of reference indicate corresponding parts in all the various figures.

A is a series of heating-tubes; B, the upper water and steam drum; C, the lower or mud drum; D, the steam-drum.

E is a vertical water-tube, of which there may be one or more, arranged at the back end of each section and behind the bridge-wall, so as to allow a free circulation of the water, a downward current being caused within said tubes, in consequence of being arranged outside of the combustion-chamber. This part of the boiler is made of the usual material—boiler-plate.

The mud and steam and water drums are flattened on one side for greater convenience in fitting the tubes to them, which are expanded within the drums, as shown in section, Fig. 6, by forming a bead near each end of the heating or circulating tubes to abut against the exterior surface of said drums.

The extreme ends of the tubes are then lapped over the interior surface of the drums to draw the exterior beads upward into intimate contact therewith, while at the same time the ends of the tubes are expanded to completely fill the apertures in said drums through which said tubes are passed.

A number of sections, constructed as above described, are placed a sufficient distance apart to admit the location of the grate G between them when it is desired to erect a battery of boilers, or two of them only for a single boiler. In the former case we arrange the sections in such manner that the heating-tubes A are vertical, and connect each section with its neighbor by means of the connecting-tubes L in the mud-drums, and with a steam-drum, D, by suitable connecting-pipes, as illustrated in Fig. 1.

If desired, in order to increase the grate-surface in such a battery, every alternate section may be made shorter, so that one mud-drum is placed above the grate, as shown in Figs. 1, 2, and 3, where the mud-drums C′ are so located, and connected with the mud-drums C on each side by the tubes E′, and with the steam and water drum B by the heating-tubes A and circulating-tube E, the same as in the adjacent sections.

In a single boiler composed of two mud-drums with their heating-tubes and one or more steam and water drums, &c., we arrange the heating-tubes obliquely, bringing them nearer together at their upper end than at their lower, but in other respects arrange them in precisely the same manner as in a battery of boilers.

The boiler or boilers are set in masonry consisting of the walls J, erected upon proper foundations, and inclosing the entire structure up to and above the center of the middle drum or drums, B, the front wall being supplied with the usual openings and doors for the ingress of air to supply combustion and stoke the fire, and the rear wall with the duct K, leading the gases of combustion to the chimney.

If desired, the walls J may be made with air-passages H surrounding the boiler, whereby considerable heat that would otherwise pass through the brick-work and be lost by radiation is made available to heat the cold air admitted at the top, which air is led under the grate through the ducts *i*. In this case the door in the ash-pit should be kept closed, and the draft regulated by a damper arranged outside of the escape-flue K.

Having thus fully described our invention, we desire to secure to us by Letters Patent of the United States—

1. The combination, in a sectional steam-generator, of the mud-drum C, the steam and water drum B, inclined water-tubes A, and steam-receiver D, all constructed and arranged to form an upper contracting combustion-chamber, as and for the purpose set forth.

2. The combination, in sectional steam-generators, of the lower longitudinal drum, B, mud-drum C, the inclined series of water-tubes A, connecting said drums, arranged to form an upper tapering combustion-chamber, and the central series of circulating-tubes connecting said drums, for the purpose herein set forth and described.

3. The combination, in sectional steam-generators, of the longitudinal water-drum C, longitudinal steam and water drum B, the former flattened on its upper surface and the latter on its under surface, and connected together by a series of water-tubes in an inclined position from bottom to top, whereby the flame, as it decreases in intensity, is made to impinge with more force upon the tubes in the contracted portion of the combustion-chamber, substantially as herein described.

4. In steam-generators consisting, essentially, of the mud-drums C and steam and water drums B, connected by rows of heating-tubes A, the auxiliary section composed of the drum C′, heating-tubes A, and drum C, said auxiliary section being located above the grate G, arranged between the drums C, and connected therewith by the inclined pipes E′, substantially as and for the use and purpose specified.

In testimony that we claim the foregoing as our invention we have hereto set our hands and affixed our seals in the presence of two subscribing witnesses.

J. FIRMENICH. [L. S.]
F. P. STIKER. [L. S.]

Attest:
MICHAEL J. STARK,
FRANK HIRSCH.